A. M. PRICE.
WRAPPING MACHINE.
APPLICATION FILED JUNE 1, 1908.
942,101.
Patented Dec. 7, 1909.
12 SHEETS—SHEET 7.
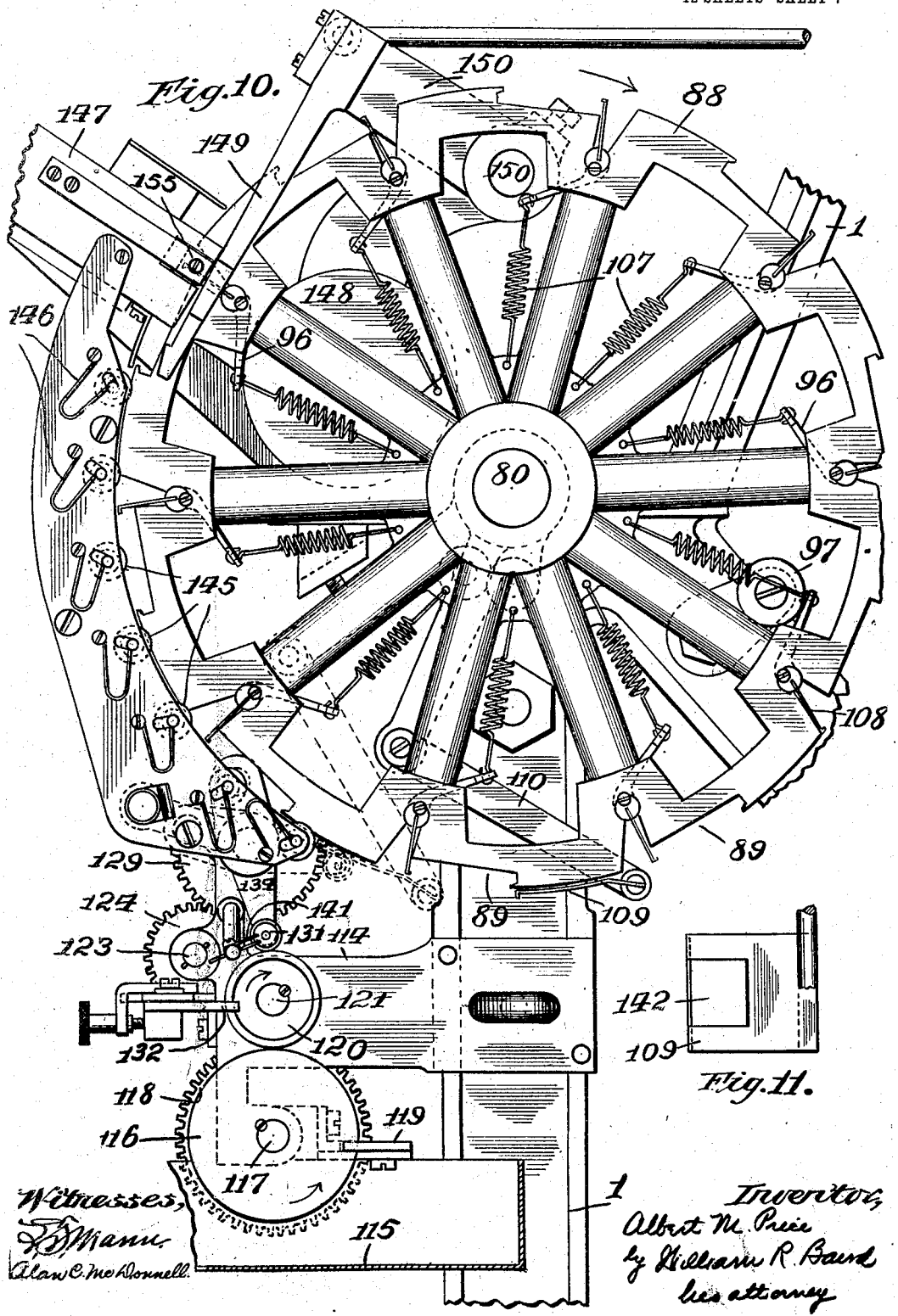

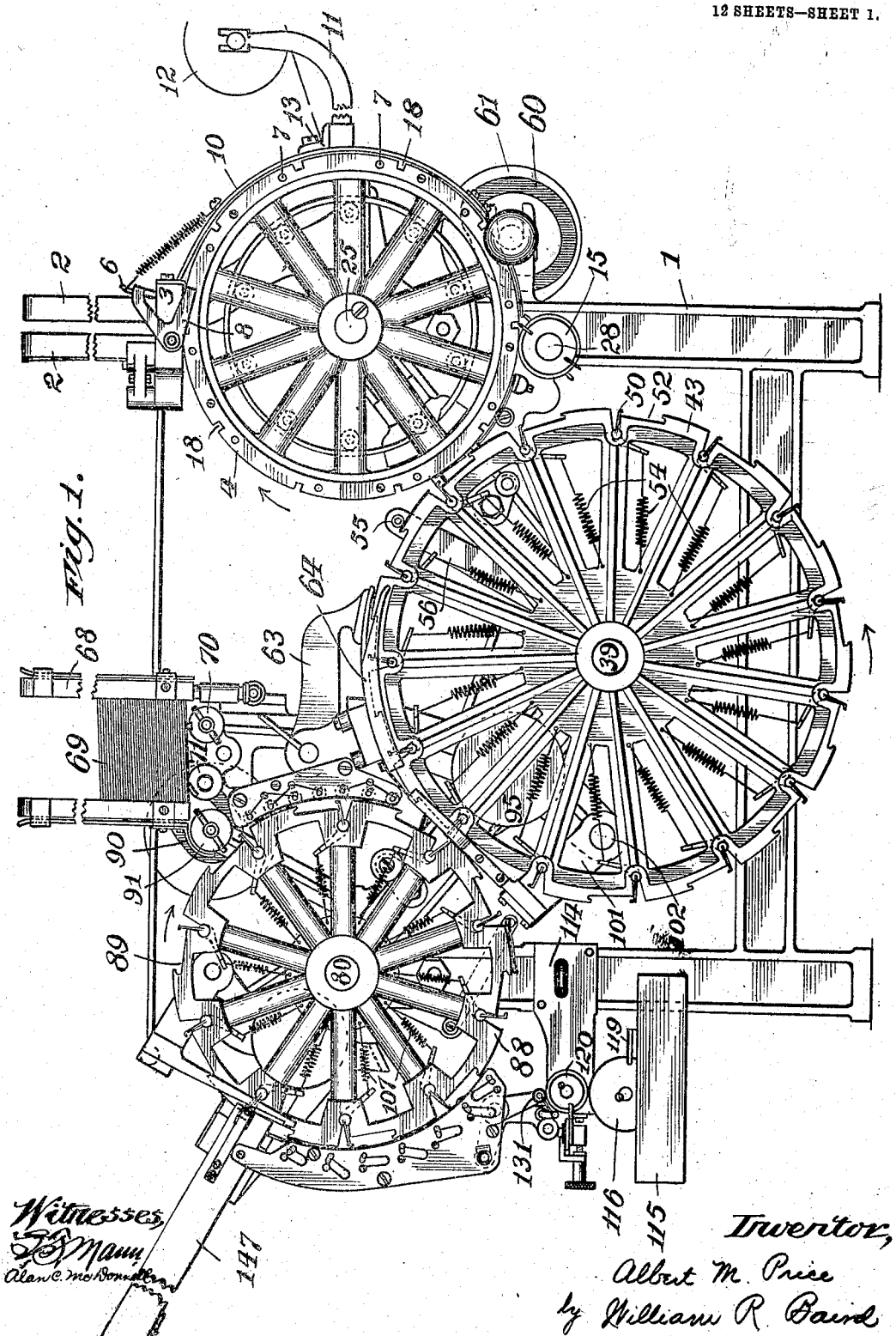

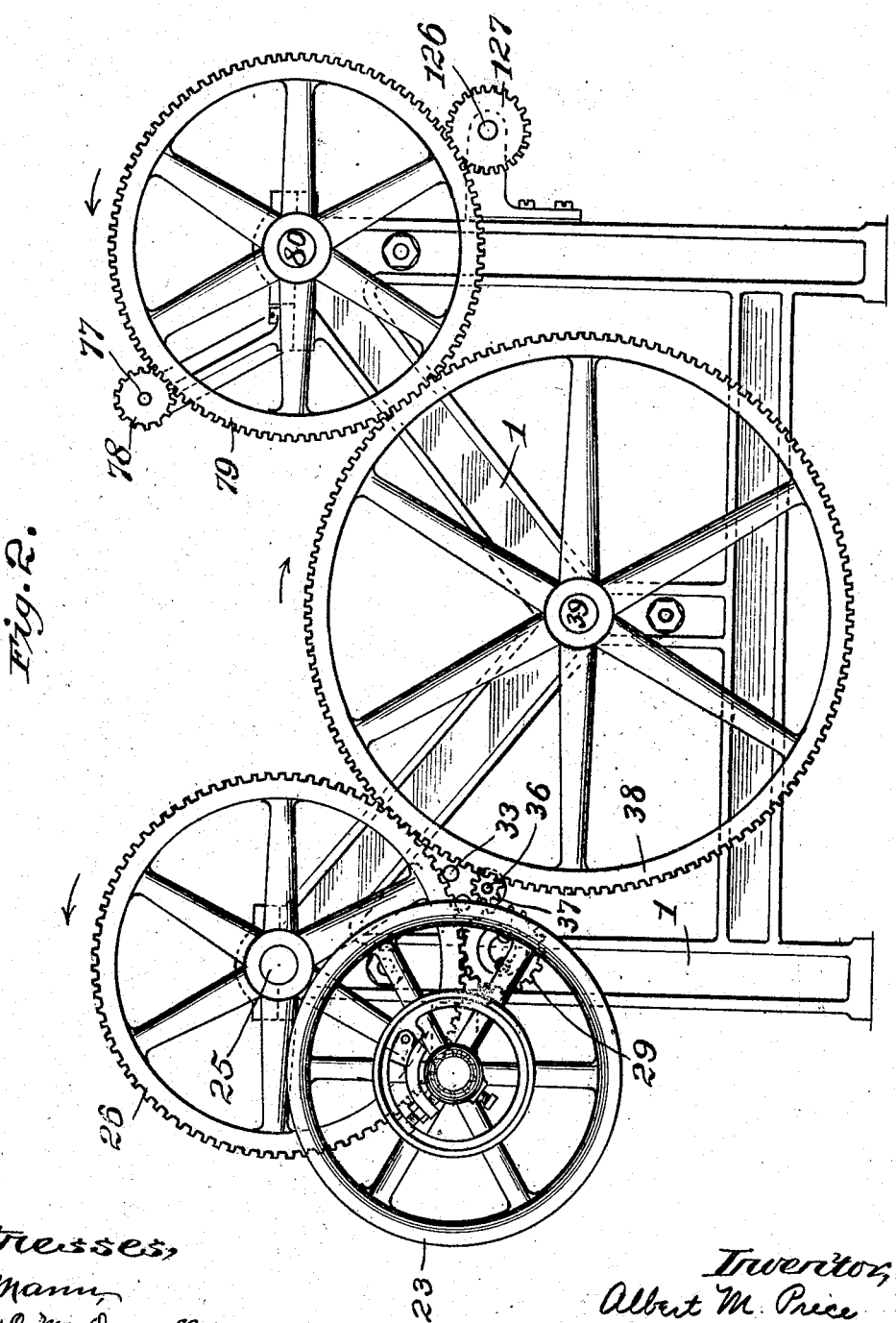

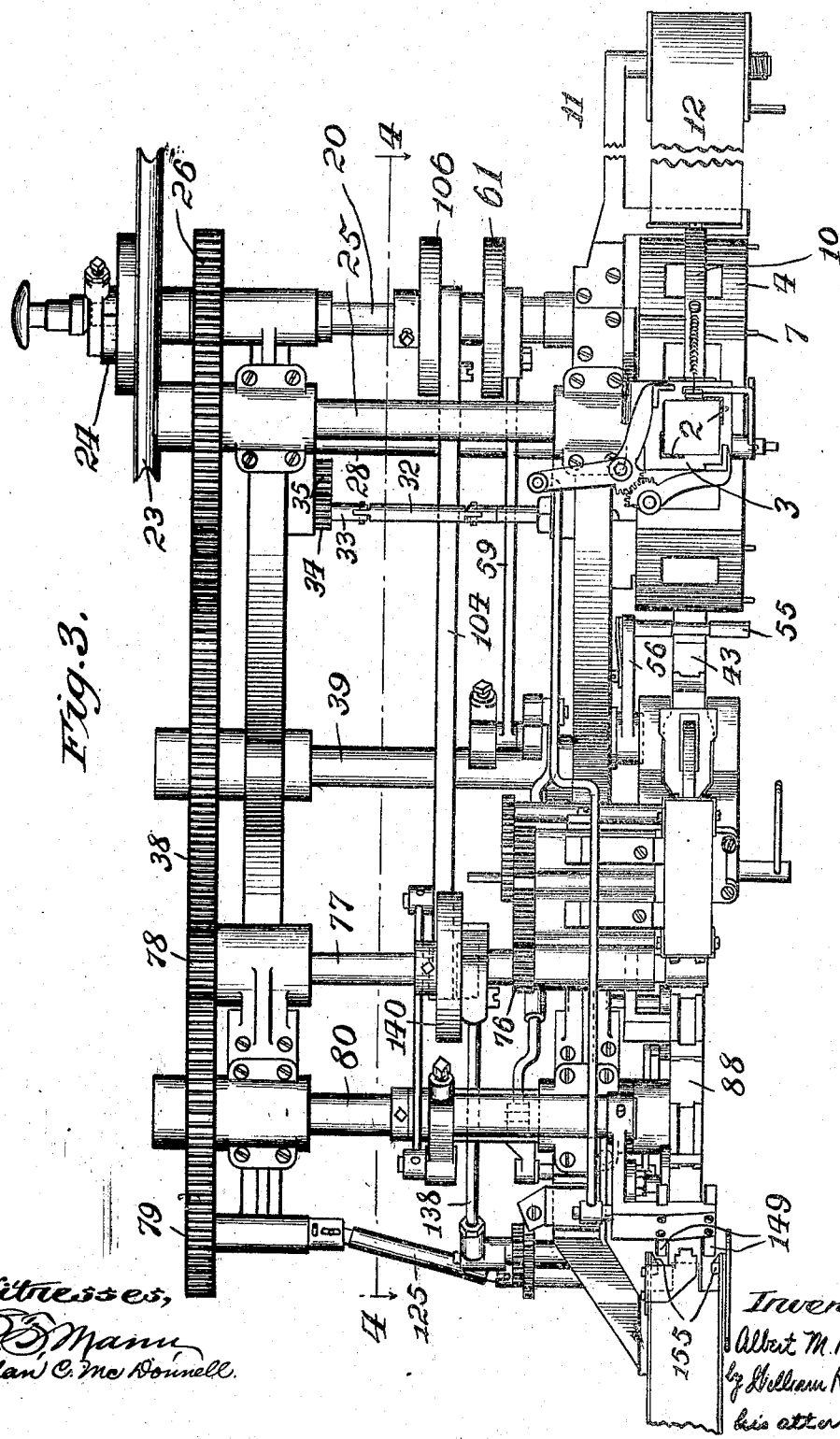

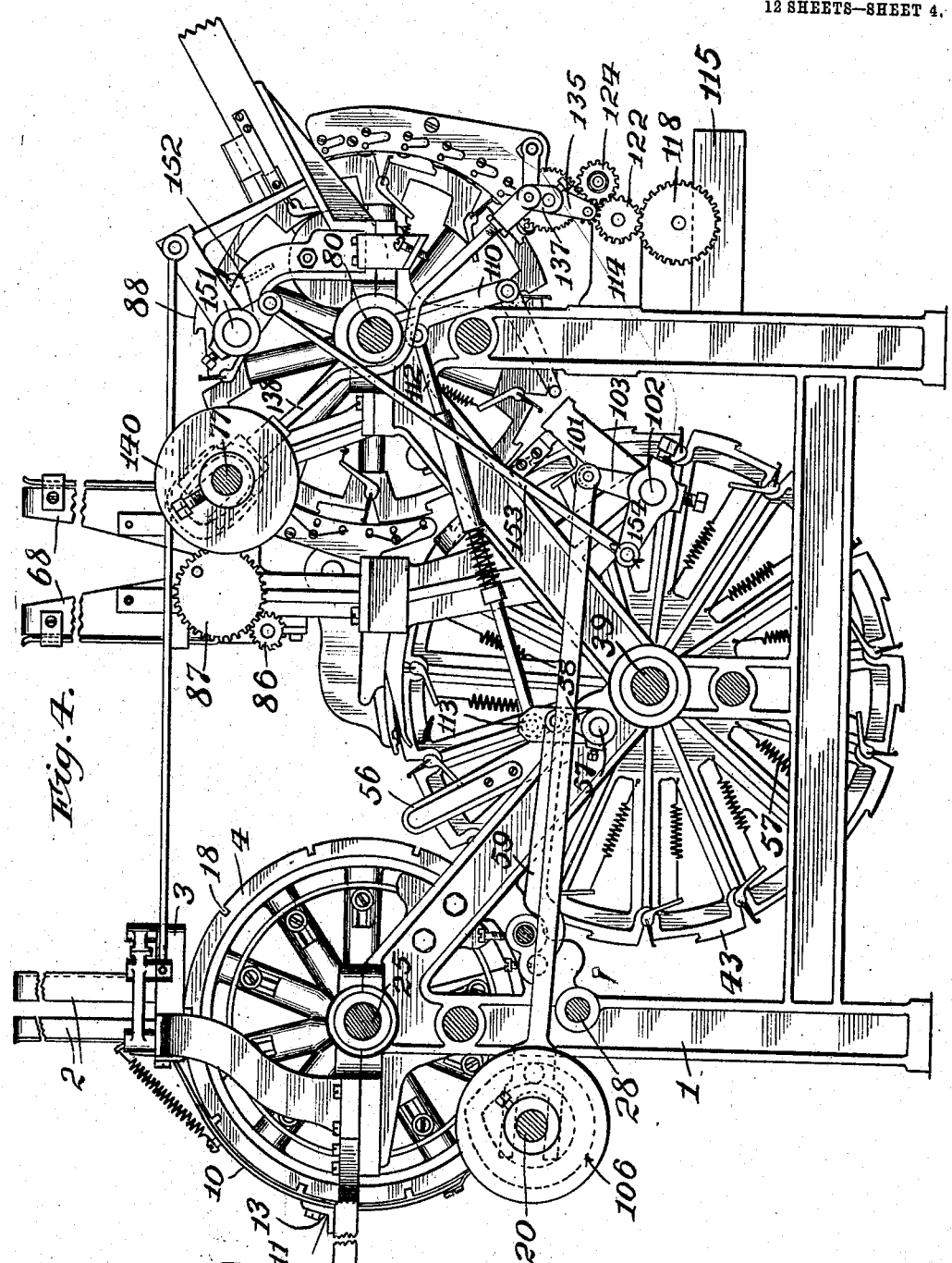

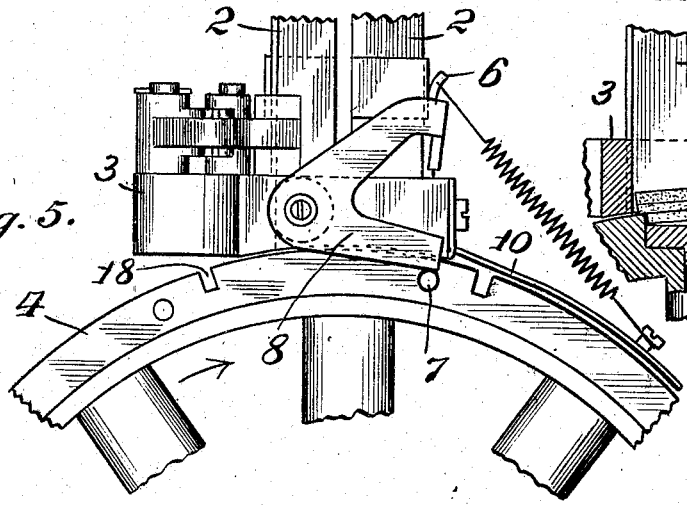
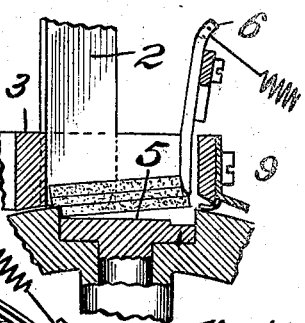
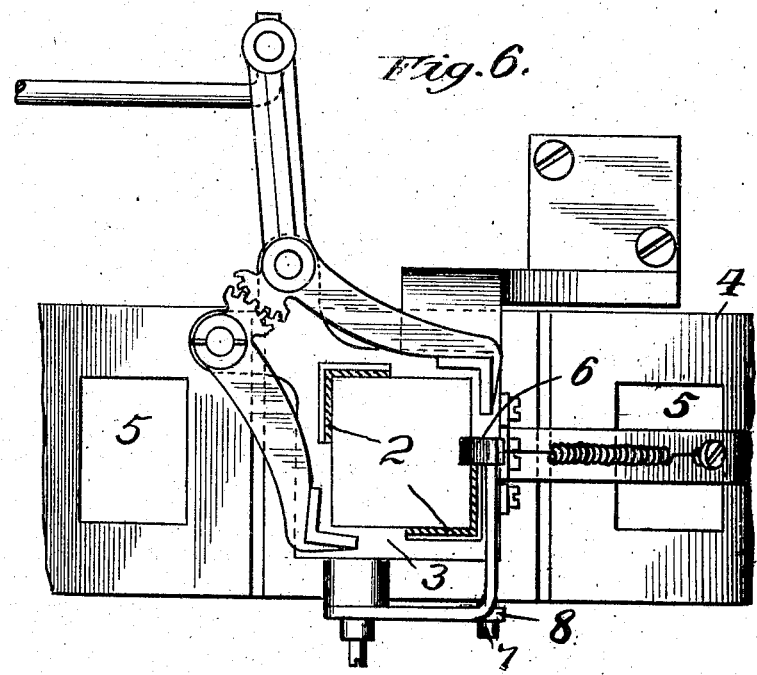

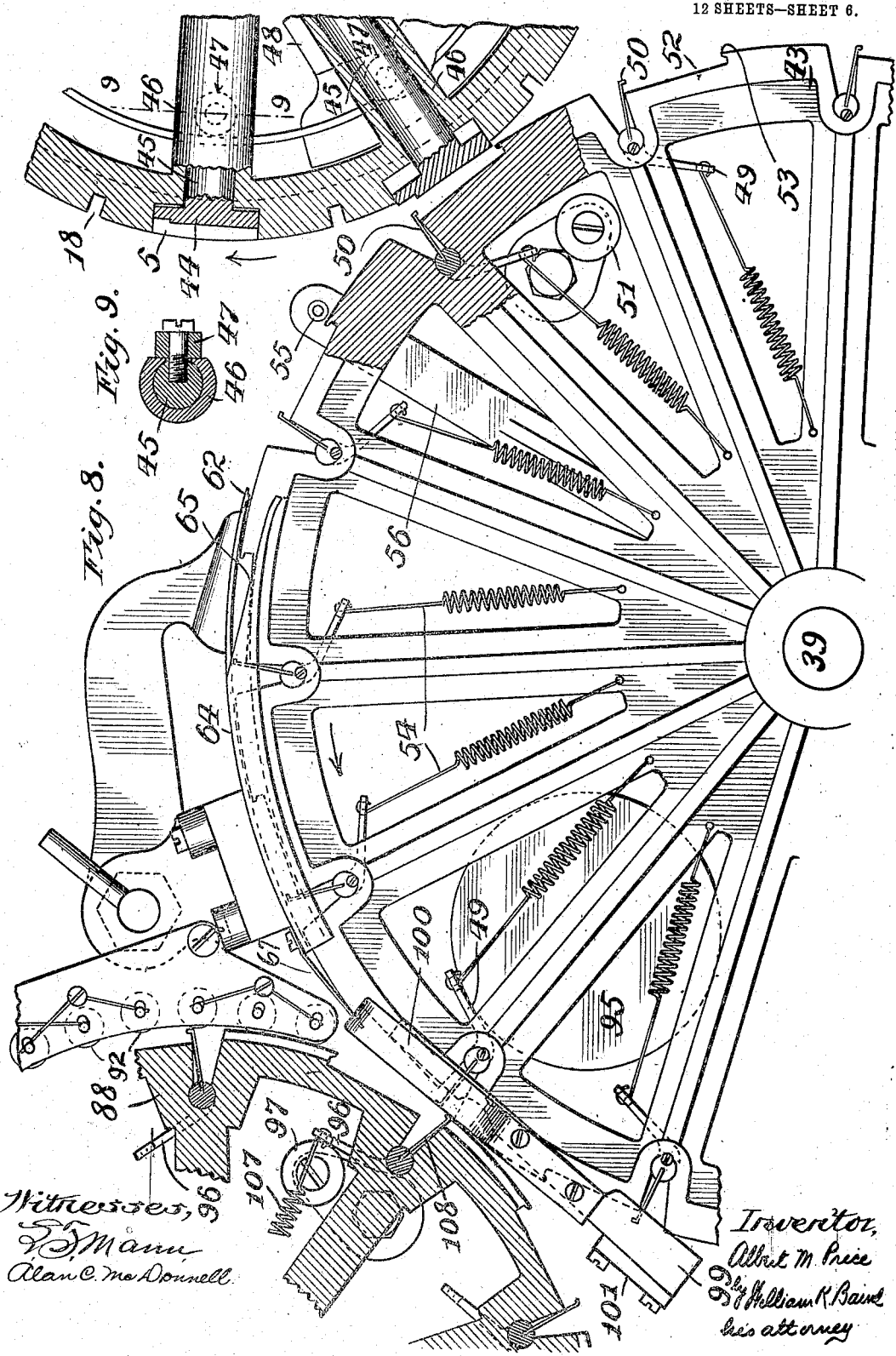

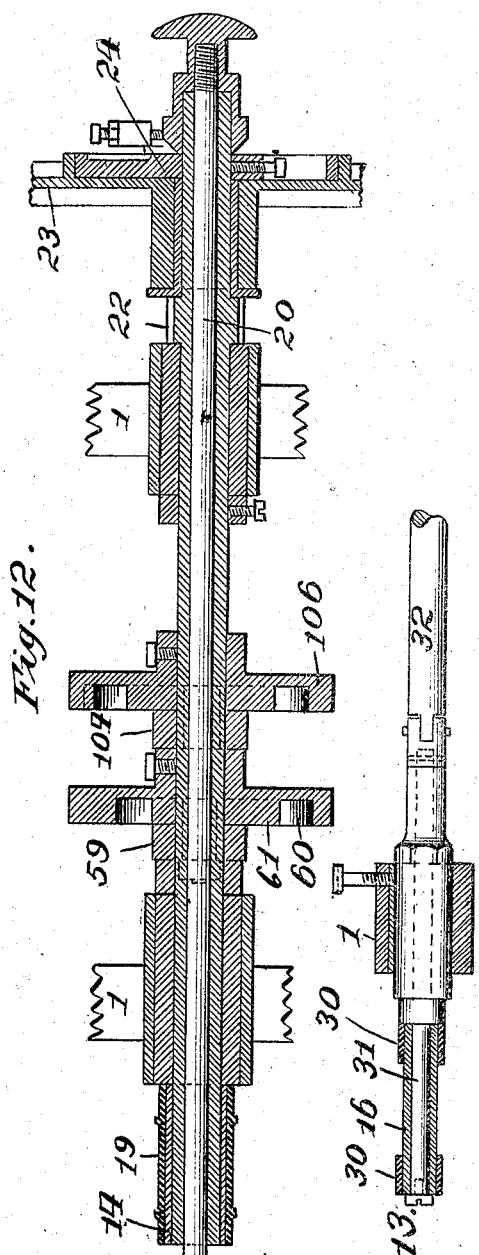
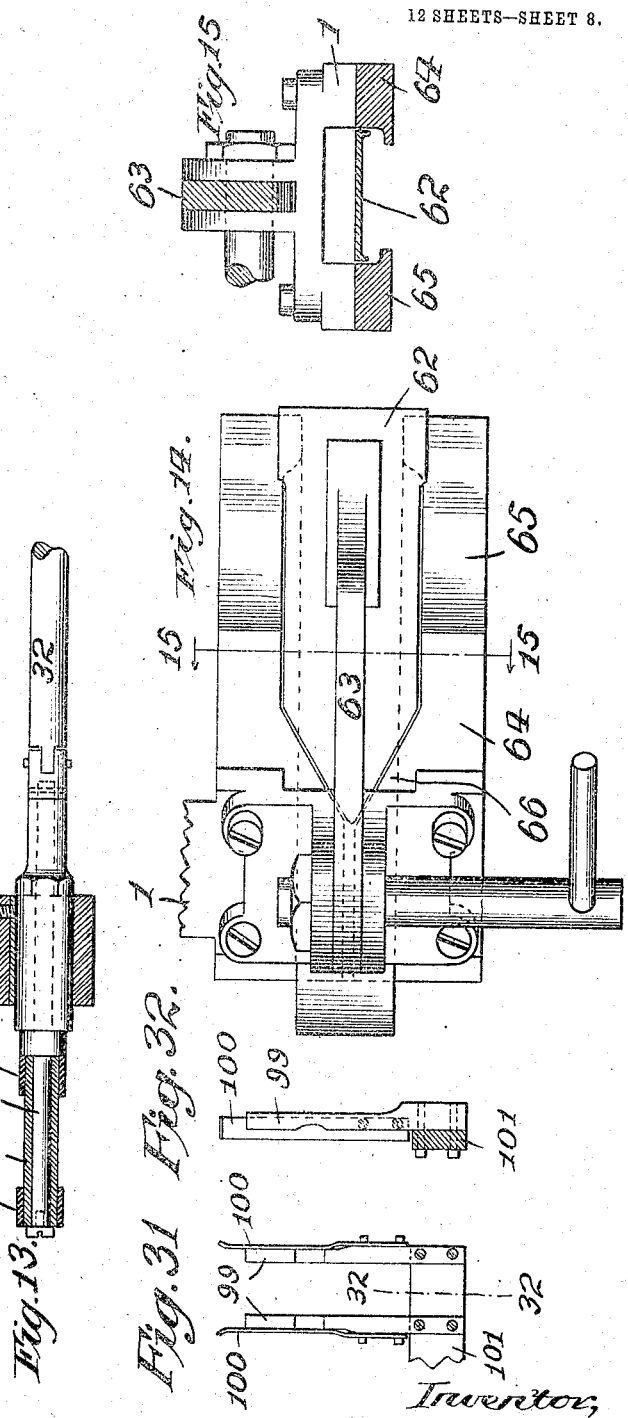

A. M. PRICE.
WRAPPING MACHINE.
APPLICATION FILED JUNE 1, 1908.
942,101.
Patented Dec. 7, 1909.
12 SHEETS—SHEET 9.
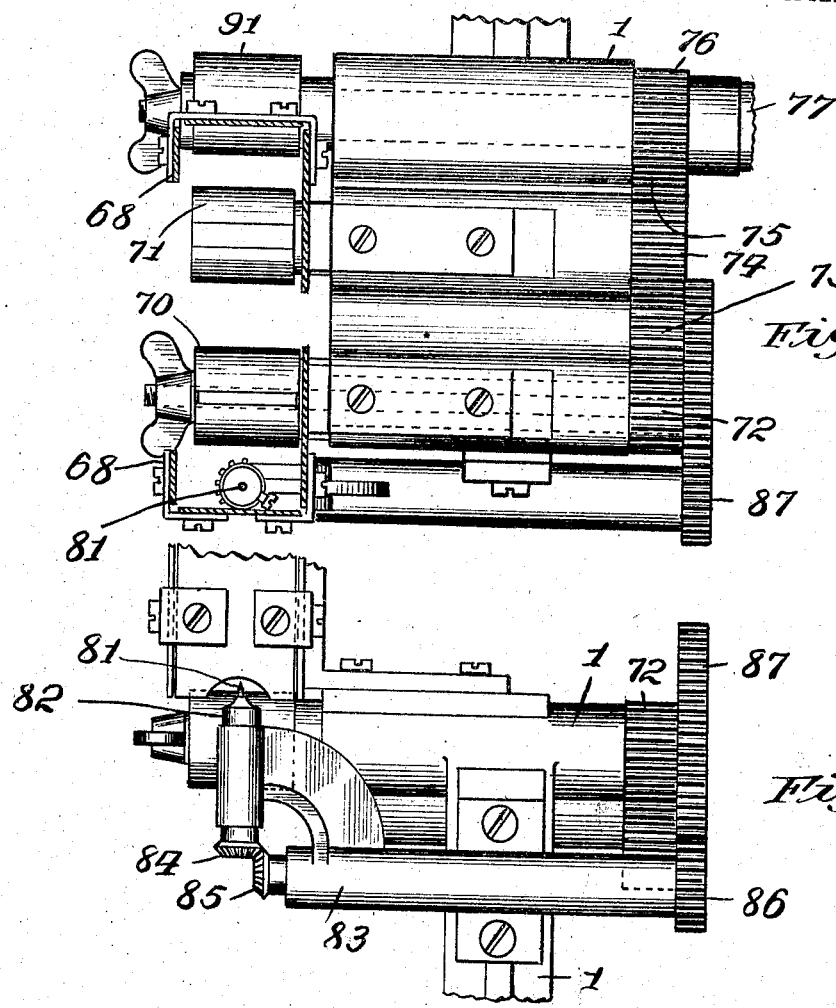
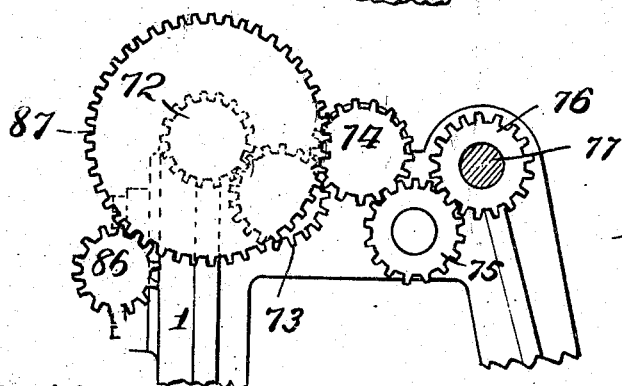

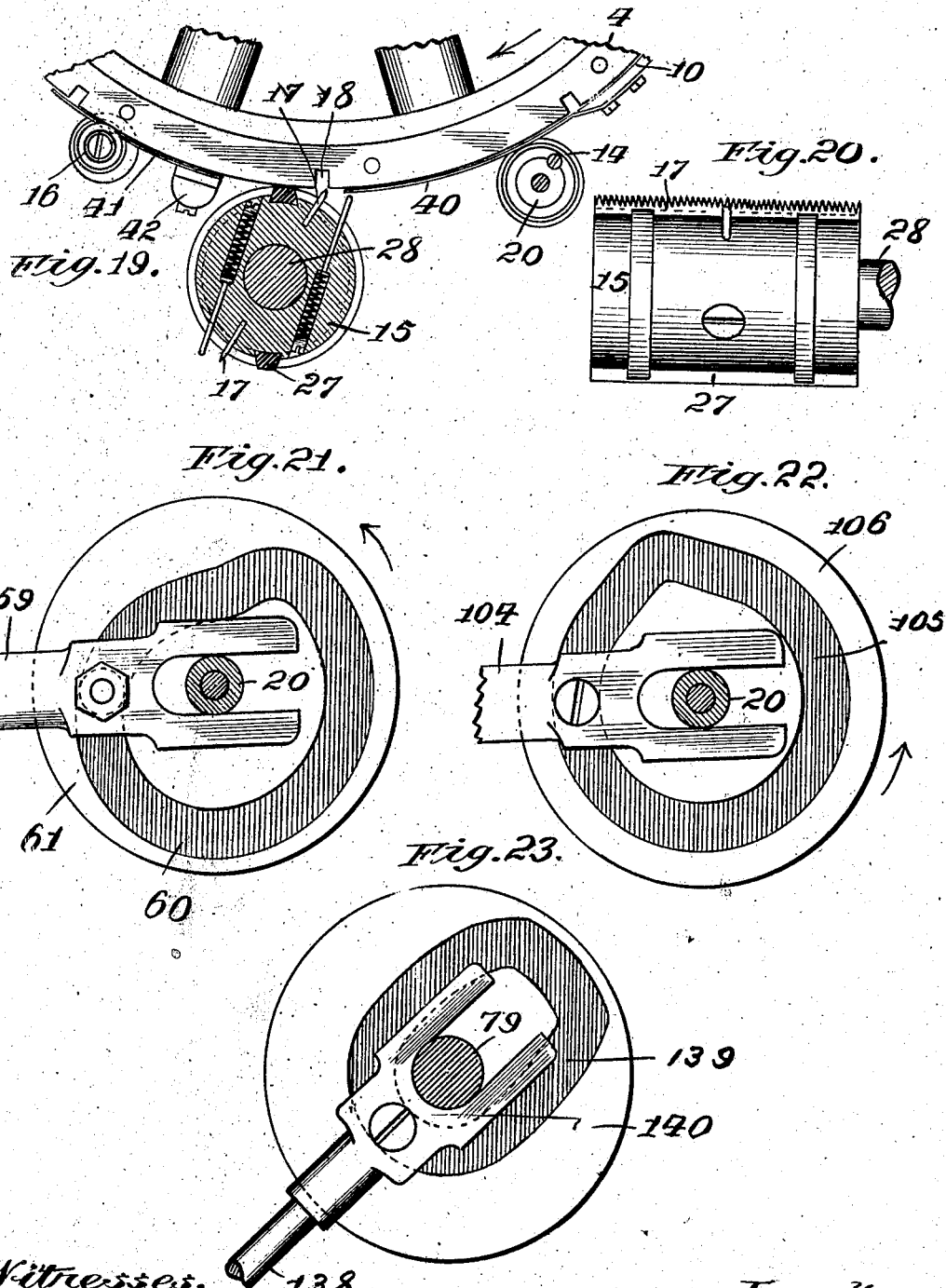

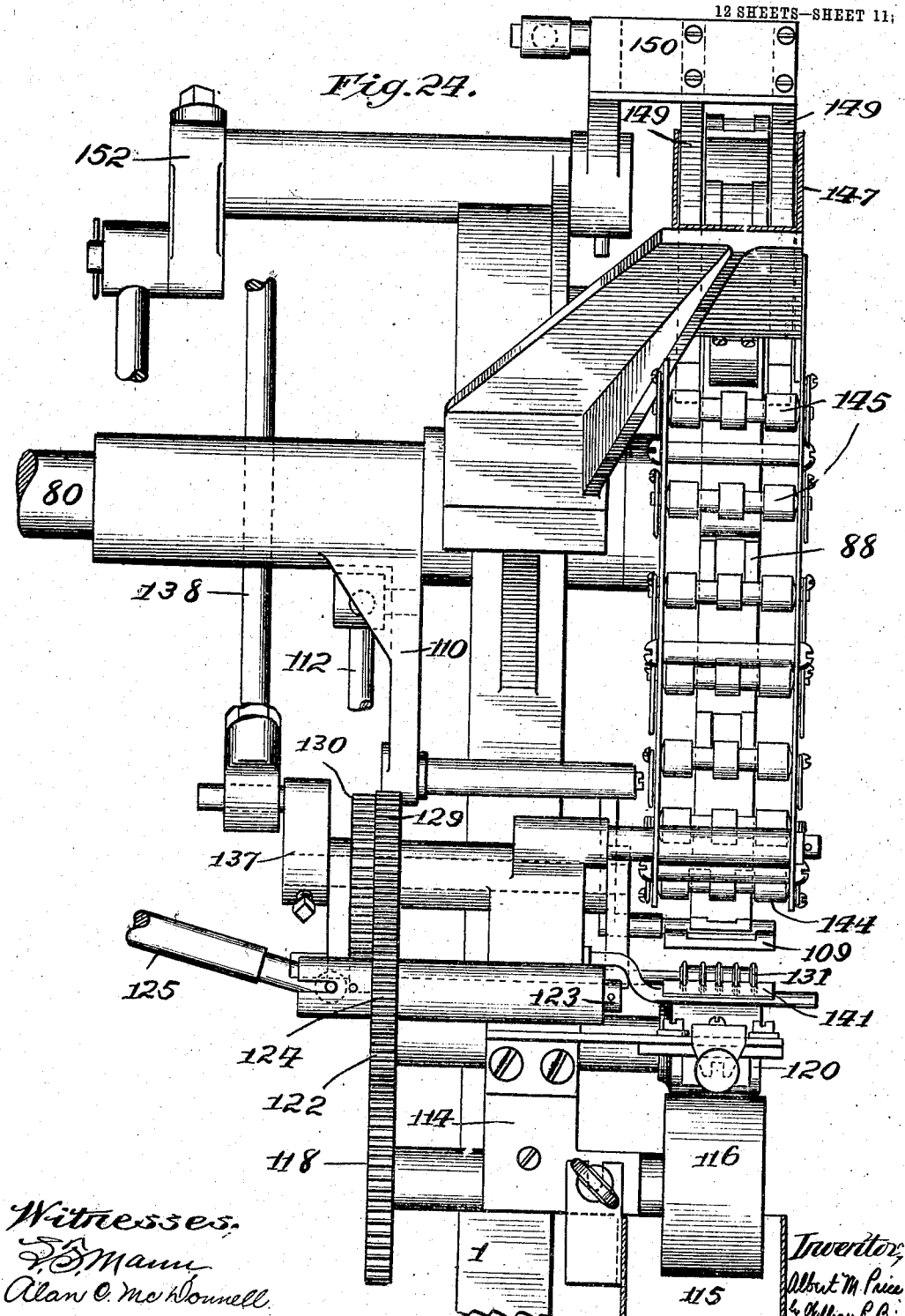

A. M. PRICE.
WRAPPING MACHINE.
APPLICATION FILED JUNE 1, 1908.
942,101.
Patented Dec. 7, 1909.
12 SHEETS—SHEET 12.
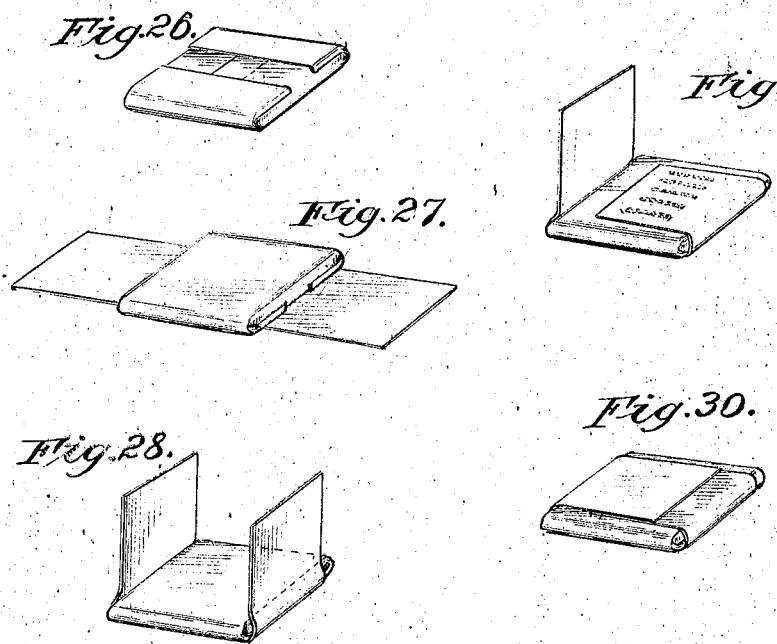
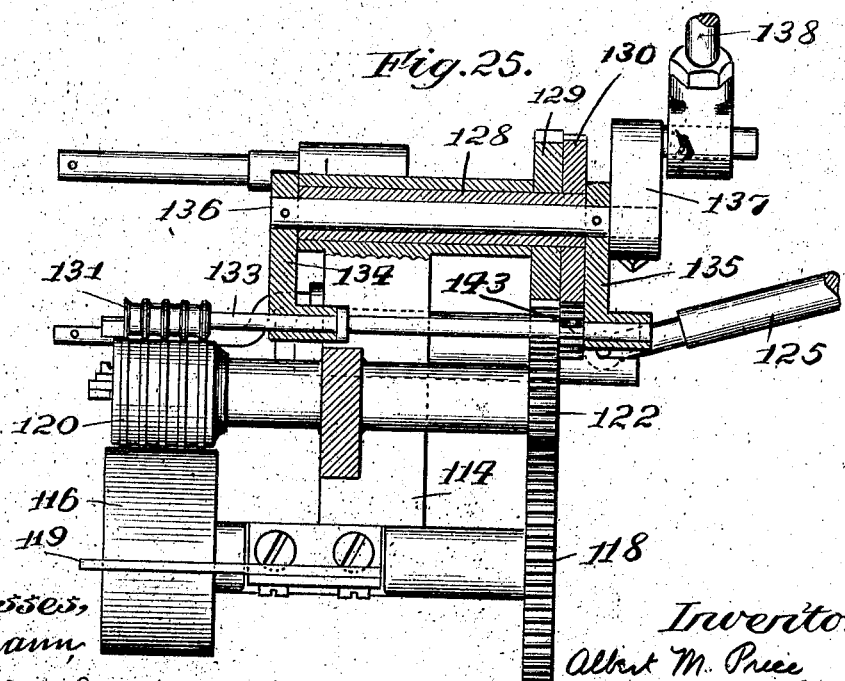

UNITED STATES PATENT OFFICE.

ALBERT M. PRICE, OF ELGIN, ILLINOIS.

WRAPPING-MACHINE.

942,101.     Specification of Letters Patent.     Patented Dec. 7, 1909.

Application filed June 1, 1908. Serial No. 436,001.

*To all whom it may concern:*

Be it known that I, ALBERT M. PRICE, a citizen of the United States, and a resident of Elgin, in the county of Kane and State of Illinois, have invented certain new and useful Improvements in Wrapping-Machines, of which the following is a specification.

My invention relates to machines adapted automatically and rapidly to wrap small articles, such as chewing gum, in one or more coverings of suitable material, and particularly to that class of wrapping machines adapted to completely inclose articles in a wrapper of waxed paper, or other suitable material, and to encircle or bind the first wrapper with a band or printed label, and finally to secure the over-lapping ends of the bands by means of an adhesive material.

I have illustrated and will describe a preferred adaptation of my invention, wherein I apply it to a modification of the invention which is the subject matter of my application for Letters Patent, filed August 13th, 1905, Serial No. 278,338.

In the adaptation of the invention herein described, I have shown a machine in which the first, or inner, wrapping of the article is accomplished by essentially the same mechanical devices as those employed to perform the same functions in the machine described in the application, Serial No. 278,338, but I have also shown mechanism for placing but one wrapper on each article prior to placing and securing the band. It will, however, readily be understood that my invention can be adapted to machines which inclose an article simultaneously in two or more inner wrappers.

In the accompanying drawings Figure 1 is a front elevation of a machine embodying the invention; Fig. 2 is a rear elevation thereof showing the train of gearing by which the power is transmitted to the different sections of the machine, the parts in the background having been omitted for simplicity; Fig. 3 is a plan view of the machine; Fig. 4 is a sectional elevation taken on the plane of the line 4—4 in Fig. 3; Fig. 5 is a front elevation of the lower portion of the magazine for containing the articles to be wrapped, and a section of the wheel which removes the articles from the magazine; Fig. 6 is a plan view of the devices shown in Fig. 5; Fig. 7 is a detail section of a part of the devices shown in Fig. 5; Fig. 8 is a front elevation of the machine, partly in section, showing the feeding wheel, the wheel in which the article is carried during the folding of the first wrapper, and means for folding the same; the wheel on which the article is carried while the band is being folded and glued, and means for transferring the partially wrapped article from one wheel to the other; Fig. 9 is a section taken on the plane of the line 9—9 in Fig. 8; Fig. 10 is a partial front elevation of the machine, showing the wheel on which the articles are carried while the band is being folded and glued, the mechanism for folding the band and applying the adhesive, a portion of the chute for containing the completed packages, and the mechanism for transferring such packages from the wheel to the chute; Fig. 11 is a plan view of the member for folding the rear end of the band; Fig. 12 is a sectional view of the driving shaft and attached parts; Fig. 13 is a detail view, partially in section, of the roller used in holding the tissue paper against the feeding wheel; Fig. 14 is a plan view of the device for folding over the ends of the first wrapper; Fig. 15 is a sectional view on the plane of the line 15—15 in Fig. 14; Fig. 16 is a plan view of the mechanism for feeding the bands; Fig. 17 is an end elevation of the mechanism shown in Fig. 16; Fig. 18 is a rear elevation of the mechanism shown in Figs. 16 and 17; Fig. 19 is a front elevation partially in section, showing the mechanism for cutting the waxed paper; Fig. 20 is a detail view of the cutting roller shown in Fig. 19; Fig. 21 is a detail view of the cam which operates the mechanism for folding the rear ends of the first and second wrappers; Fig. 22 is a detail view of the cam which operates the mechanism for transferring the articles from the first wrapping wheel to the second wrapping wheel and ejecting the articles from the second wrapping wheel; Fig. 23 is a detail view of the cam for swinging the gluing roller into contact with the band; Fig. 24 is an end elevation, partially in section, showing the mechanism for folding and gluing the band; Fig. 25 is an end elevation, partially in section, taken in the opposite direction to that of the view shown in Fig. 24; Fig. 26 is a perspective view of the package as it appears after the first wrapper is completely folded; Figs. 27, 28, 29 and 30 are perspective views showing the consecutive stages assumed in placing the band about the previously wrapped article. Fig. 27 shows the relative position of the previously wrapped article and the band, as the two are first brought into contact, showing that the end folds of the first wrapper are faced against the band; Fig. 28 shows the appearance of the article after it has been deposited in the banding wheel with the ends of the band not yet folded; Fig. 29 shows the package with the rear end of the band folded down and the lines of adhesive material deposited thereon, and pressed against the adhesive material which secures it in this position. Fig. 30 shows the package complete with both ends of the band folded down. Fig. 31 is a detail of the ejecting fingers of the transfer fingers, and Fig. 32 is a side elevation and partial section on the plane of the line 32—32 in Fig. 31.

In the drawings, 1 is a suitable frame to which all other parts of the machine are attached, either directly or indirectly.

A suitable magazine for containing the articles to be wrapped is provided, consisting of two angular uprights 2 (Figs. 1 and 3) secured to a base 3, which in turn is secured to the frame 1. The manner in which the articles are placed in this magazine, one above the other, will be best understood by reference to Fig. 7. The bottom of this magazine is entirely open and revolving beneath it is a continuously rotating feeding wheel 4 containing pockets 5 each of sufficient depth to contain one article.

As the pocket 5 approaches the opening in the bottom of the magazine, a finger 6 is raised to the position shown in Fig. 7 by the passage of a pin 7 under an arm 8. This allows the forward end of the article to pass beneath the point of the finger 6, when the rear edge of the pocket 5 forces it forward. As the wheel continues to rotate to a slightly advanced position, the finger 6 is forced downward onto the forward end of the first article, and in advance of the succeeding articles, thus preventing them from being carried under a tapered portion 9 of the base 3. As the first article advances the taper 9 forces it down into the pocket 5 and it is carried around beneath a guard 10 with which the wheel 4 is provided.

Mounted on a suitable spool, journaled in supports 11, is a strip of waxed paper or similar suitable wrapping material 12. This strip of paper passes through a slot at the point 13, through the guard 10, and on to the periphery of the wheel 4, thus covering the articles in each successive pocket after they pass the point 13. This waxed paper runs between rolls 14, 15 and 16 (Fig. 10) and the wheel 4. Two knives 17 having saw-like edges, are mounted on the roll 15, and are timed to register with slots 18 in the periphery of the wheel 4, so as to penetrate and sever the strip of paper as the same is held against the wheel 4 on either side of the slot 18 by the rollers 14 and 15.

The roller 14 has a rubber covering 19 (Fig. 12) and is mounted on a shaft 20, journaled in suitable bearings in the frame 1, and is provided with a spur gear 22. Mounted on the shaft 20 is a drive pulley 23, which can be locked to the shaft 20 by a friction clutch 24 of common form.

Power is transmitted to the machine by means of a belt passing over the pulley 23. The wheel 4 is mounted on a shaft 25 journaled in suitable bearings in the frame 1, and provided with a spur gear 26, which meshes with the spur gear 22 and is driven thereby. The roller 15 is provided with rubber bars 27 for holding the wax paper in tension against the wheel 4. The roller 15 is mounted on a shaft 28 journaled in suitable bearings in the frame 1 and is provided with a spur gear 29 (Fig. 2) which meshes with the spur gear 26. The roller 16 is provided at either end with a rubber covering 30 (Fig. 13) and is mounted on a shaft 31 driven by a universal jointed shaft 32, which in turn is driven by the shaft 33 (Fig. 3) journaled in bearings in the frame 1. Mounted on the shaft 33 is a spur gear 34 which meshes with a spur gear 35, mounted on a shaft 36, (Fig. 2), journaled in bearings in the frame 1. Mounted on the opposite end of the shaft 36 is a spur gear 37 which meshes with a spur gear 38, mounted on a shaft 39 journaled in bearings in the frame 1. The spur gear 38 meshes with the spur gear 26 and is driven thereby.

A spring guard 40 (Fig. 19) mounted on the guard 10, and a spring guard 41 mounted on the frame 1 by means of support 42, are provided to assist in holding the paper against the wheel 4, and also to prevent the articles from dropping from the pockets 5.

Each successive strip of paper severed by the knives 17 is of a length equivalent to the length between two adjacent slots in the wheel 4, and is carried forward by the roller 16, to a point where the wheel 4 becomes tangent to another continuously rotating wheel 43 (Fig. 8). As the slots 18 are approximately equally spaced between the pockets 5, the pieces of paper thus severed will also be approximately equally spaced over the articles to be wrapped contained in the pockets 5. Each of the pockets 5 contain a plunger 44 having a stem 45 sliding in a spoke 46 of the wheel 4. Mounted on the inner side of these stems is a roller 47 (Fig. 9). Mounted on the frame 1 is a stationary cam 48. As each successive spoke of the wheel 4 approaches the radial line common to it and the wheel 43, the roller 47 passes through a groove in the cam 48 and forces the plunger 44 outward to the lower position shown in Fig. 8, thus forcing out the article contained in the pocket and carrying with it the wrapper which had been lying against the periphery of the wheel 4. Previous to this a tail piece 49 of a hinged jaw 50 passes over a stationary pivoted roller 51 thus opening a pocket 52 formed by the jaw 50 and a lip 53, in the wheel 43. The article and its wrapper thus forced from the pocket is deposited in an open pocket 52 of the wheel 43 and immediately following the article and its wrapper which is thus transferred from one wheel to the other, the tail piece 49 passes beyond the roller 51 permitting a spring 54 to close the jaw 50, and firmly gripping the article and its wrapper.

The wheel 43 is mounted on the shaft 39 driven by the spur gear 38 and during the operation of the machine rotates continuously. As the article is carried forward by the wheel 43, the rear end of the wrapper is folded down upon the article by a roller 55 (Fig. 8) mounted on an oscillating arm 56, which in turn is mounted on a shaft 57 (Fig. 4) journaled in a bearing in the frame 1.

Mounted on the shaft 57 is a crank arm 58, to the upper end of which is pivoted a connecting rod 59 (Figs. 3, 4 and 21). The connecting rod 59 is given a suitable reciprocating motion by means of a roller secured thereto and running in a cam track 60 of a cam 61 (Fig. 21) secured to the shaft 20. The shaft 20 rotates once in the time required by the wheel 43 to travel the circumferential distance from one pocket to the next, so that the roller 55 is given a complete backward and forward movement as each pocket passes, thereby folding the rear fold of each wrapper as the articles are successively carried by it. The front end of the wrapper is folded down over the rear end by the passage of the article under a shoe 62 (Fig. 8) carried on an arm 63 mounted on the frame 1.

Mounted on either side of the wheel 43, and secured to the frame 1, are stationary folders 64 (Figs. 8 and 14). An inclined surface 65 of the folders 64 simultaneously turns up both sides of the wrapper projecting beyond the article and the over hanging wings 66 fold these sides of the wrapper upon the article, thus completing the folding of the first wrapper. The article thus wrapped is carried onward by the wheel 43 beneath a spring guard 67 (Fig. 8) which holds it in position and it is now ready to receive the band and I will now describe the means used for feeding these bands to this point.

Mounted on the frame 1 is a magazine composed of two vertical channels 68 (Figs. 1 and 16) adapted to receive the labels or bands 69, which are stacked in the magazine one above the other. This magazine has no bottom, and located beneath it, and forming a support for the labels are two rollers 70 and 71. The roller 70 is mounted on a shaft journaled in a bearing in the frame 1, and on the opposite end of this shaft from the roller 70 is a spur gear 72, which meshes with a spur gear 73, mounted on a stud in the frame 1. The gear 73 meshes with a gear 74 which is mounted on a shaft journaled in the frame 1, and on the opposite end of which is mounted the roller 71. The gear 74 meshes with a gear 75 (Figs. 16 and 18) which is mounted on a stud in the frame 1. The gear 75 meshes with a gear 76 mounted on a shaft 77 (Figs. 2, 16 and 18) journaled in the frame 1, and on the opposite end of which is mounted a gear 78. The gear 78 meshes with a gear 79, which meshes with the gear 38 and is mounted on a shaft 80 (Fig. 2).

Directly under one end of the stack of labels 69 is a needle 81 (Fig. 17) having a gimlet-like point. The needle 81 is mounted on a shaft 82, journaled in a bracket 83, secured to the frame 1. On the shaft 82 is a beveled gear 84 meshing with a beveled gear 85, mounted on a shaft journaled in the bracket 83, and on the opposite end of which is a spur gear 86 (Fig. 18) which meshes with a spur gear 87 mounted on the same shaft as the gear 72. The gimlet like needle 81 is thus given a rotary motion in the proper direction to cause it to bore its way upward into several of the labels of the stack 69.

A portion of the surface of the rollers 70 and 71 is composed of soft rubber, or other friction material, and the balance of the surface is composed of hard metal or other non-friction material. As these rollers 70 and 71 are rotated and the friction sections of their surface come in contact with the bottom-most labels, the same are torn from the needle 81, because the friction between the label and the roller causes a greater pull than can be restricted by the small section of paper between the needle and the end of the label. The friction between the first label and the second label, however, is not sufficient to cause the second label to be torn from the needle. The friction and non-friction portions of the surfaces of the rollers 70 and 71 are so proportioned, and the rollers so timed, that for a short space of time, after the rear end of the label being removed passes beyond each roller in succession, only the non-friction surface of the rollers will be in contact with the next preceeding label, so that there is no immediate tendency for it to be pulled from the needle. At the proper moment the friction surfaces of both rollers will simultaneously come in contact with the next label, and it will be started as was the previous one. In this manner, one label is fed for each complete rotation of the rollers.

Mounted on the shaft 80 is a wheel 88 provided with pockets 89, similar in construction to the pockets 52 on the wheel 43. As the labels are successively fed from the magazine they are held by a guard 90 (Fig. 1) against a roller 91, mounted on the shaft 77. This changes the direction of travel of the labels and they are brought into contact with the periphery of the wheel 88, which is so timed relatively to the rubber feed rollers 70 and 71 that a label is approximately evenly spaced over each successive pocket in the wheel 88. As the labels thus come into contact with the periphery of the wheel 88 they are caused to maintain their relationship with the wheel by means of a series of rollers 92 (Fig. 8) mounted in a frame 93 and held against the wheel 88 by springs 94. The bands are thus carried around on the circumference of the wheel 88 to a point near the common radial line of the wheels 88 and 43. The wheels 88 and 43 are so timed that their respective pockets will register.

As the pockets in the wheel 43 approach the common radial line of the two wheels, they are opened by the tail pieces 49 running over a roller 95, stationarily pivoted to the frame 1. The pockets in the wheel 88 are similarly opened by tail pieces 96 passing over a stationary pivoted roller 97 (Fig. 8). The previously wrapped article is transferred from the open pocket in the wheel 43 to the open pocket in the wheel 88 by means of a pair of reciprocating fingers 99 (Fig. 4), and the article in thus entering the pocket in the wheel 88 carries with it the label which has been previously placed over each of said pockets, so that the label is brought into proper relationship with the bottom and two edges of the wrapped article.

The fingers 99 are assisted in transferring the article from one wheel to the other by spring side plates 100 which press on the ends of the article and prevent it from falling or becoming otherwise displaced while being transferred. The fingers 99 are mounted on an arm 101 (Figs. 1 and 4) mounted on a shaft 102 which is journaled in a bearing in the frame 1. Also mounted on the shaft 102 is a crank arm 103 to which is pivoted a connecting rod 104 (Figs. 4 and 22) which is given a reciprocating motion by a roller secured to the rod and running in a cam track 105 of a cam 106 mounted on the shaft 20. By this means the fingers 99 are given an oscillating motion as each article arrives at the point where it should be transferred from one wheel to the other. While each successive article is still held by the fingers 99 in the pocket in the wheel 88, the tail piece 96 passes beyond the roller 97 and permits a spring 107 to close the jaw 108, thus grasping the article and the band or label. The transfer of the article from one wheel to the other and the bringing of the article and band in proper relationship to each other has thus been accomplished during the continuous rotation of the two wheels. As each successive article thus held passes a predetermined point in the course of travel of the circumference of the wheel 88, the rear end of the band is folded down upon the article by a reciprocating member 109 (Figs. 10 and 11) carried by an arm 110, to which is pivoted a connecting rod 112 (Fig. 4), the opposite end of which is pivoted to a crank arm 113 mounted on the shaft 57, so that the member 109, as well as the roller 55 (Fig. 8) is actuated by the cam 61.

In Fig. 10 the member 109 is shown during its backward movement, that is, when moving in an opposite direction to that of the wheel 88. In dotted outline in the same figure it is shown in its extreme forward movement as it would appear when holding the rear end of the label down upon the article, although it is, of course, not in proper relation to the pocket 89.

I will now describe the mechanism for applying the adhesive material to the label. The entire gluing mechanism is carried by a sub-frame 114 (Figs. 10 and 24 and 25). 115 is a receptacle for the adhesive material. A roller 116 is so positioned that the lower portion of its circumference will run in the adhesive material contained in the receptacle 115. It is mounted on a shaft 117 journaled in a bearing in the sub-frame 114. On the opposite end of the shaft 117 is a spur gear 118. A scraper 119 is provided, which bears very close to the roller 116, thus removing all but a very thin coating of adhesive. Running sufficiently close to the roller 116 to secure therefrom a coating of adhesive is a roller 120, mounted on a shaft 121 journaled in a bearing in the sub-frame 114, on the opposite end of which shaft is a spur gear 122, which meshes with the spur gear 118.

Journaled in a bearing in the sub-frame 114 is a shaft 123 on which is mounted a spur gear 124, which meshes with the spur gear 122. The shaft 123 is connected by means of a universal jointed shaft 125, to a shaft 126 (Fig. 2) journaled in the frame 1. On the shaft 126 is mounted a spur gear 127 which meshes with the spur gear 79 and is driven thereby. Journaled in the sub-frame 114 is a hollow shaft 128 (Fig. 25) on which are mounted two spur gears, one 129, meshing with the spur gear 124, and another 130.

To transfer the adhesive from the surface of the roller 120 there is provided a roller 131 (Figs. 24 and 25) the bearing surface of which is divided into a plurality of narrow faces, which alone come in contact with, and pick up a film of adhesive from, the roller 120. In order that the film of adhesive may lie smoothly on the surface of the roller 120, a scraper 132 (Fig. 10) is provided. The roller 131 is mounted on a shaft 133 which is journaled in bearings in two crank arms 134 and 135, secured to a shaft 136 which bears in the hollow shaft 128. For the purpose of oscillating the cranks 134 and 135 and thereby oscillating the roller 131, a crank arm 137 is attached to the shaft 136, and pivoted on this crank arm is a connecting rod 138 (Figs. 4 and 23) to which is attached a roller running in a cam track 139 of a cam 140, attached to the shaft 77. This cam track is so shaped and the cam so timed, that the roller 131 will, for the major portion of the time, run in contact with the roller 120, in which position it is also in contact with a scraper 141, (Figs. 10 and 24) which serves to remove any surplus of adhesive material. At the proper time the roller 131 will be swung in an upward direction away from the roller 120 and to the position shown in dotted outline in Fig. 10. This motion occurs at the time when the rear end of the band is held down against the article by the folding member 109. Through an opening 142 (Fig. 11) in the folding member 109 the roller 131 comes in contact with the outer face of the rear end of the band, and remains there for a short period, during which the wheel 88 will have rotated a slight portion of a revolution so that the narrow, adhesive covered surfaces of the roller 131 will make a plurality of lines of adhesive on the band, as illustrated in Fig. 29.

That the roller 131 may rotate when in contact with the roller 120, and also when in contact with the band carried by the wheel 88, the shaft 133 is provided with a spur gear 143, which meshes with the spur gear 130. Thus the roller 131 will be rotated, no matter what is the position of the cranks 134 and 135. The roller 131 is now moved away from contact with the band and is carried back to contact with the roller 120, while the folding member 109 remains stationary in its forwardmost position, while the wheel 88 moves the article and band forward under a roller 144 which folds the front end of the band and presses it down against the adhesive, as shown in Fig. 30. The article now passes on under a plurality of rollers 145 (Figs. 10 and 24) which are held in the direction of the wheel by a plurality of springs 146. The rollers 145 and 144 have two grooves cut in their surfaces and the wheel 88 has a central groove in its surface, the grooves in the one registering with the remaining surfaces on the other and vice versa, so that the rollers may bear on an article carried by the wheel 88 although the surface of the article may be below the periphery of the wheel. In this manner the front end of the band is held pressed against the adhesive as the article is passed under the series of rollers 145.

Secured to the frame 1 is a chute 147 (Figs. 1, 10 and 24) which is adapted to receive the articles as they are ejected from the wheel 88. As each successive pocket in the wheel 88 approaches this chute, the tail pieces 96 pass over a stationary pivoted roller 148, whereby the pockets are opened so that the articles may be removed.

For removing the articles there are provided a pair of oscillating fingers 149 which are attached to a crank arm 150 secured to the shaft 151, journaled in a bearing in the frame 1, and to the opposite end of which is secured a crank arm 152 (Figs. 4 and 24). To the crank arm 152 is pivoted a connecting rod 153 which in turn is pivoted to a crank arm 154 attached to the shaft 102, the operating mechanism of which has been heretofore described. In this manner the fingers 149 are oscillated simultaneously with the fingers 99 so that for every article transferred into the wheel 88 by the fingers 99 an article is ejected from it by the fingers 149, at a point diametrically opposite therefrom. As each successive article is ejected from the wheel 88 into the chute 147, they are engaged and held in the chute by a pair of spring catches 155 (Figs. 10 and 3). As each successive article is thus transferred into the chute 147 it pushes forward all the articles previously so transferred and which are now ready to be removed by the operator and placed in a suitable receptacle.

It will be understood that the articles being operated upon are passing through the machine in continuous succession and that the mechanisms which have been described as performing a certain function with regard to one article will perform the same function on each succeeding article as it passes through the machine.

I will now very briefly follow the course of the articles through the machine without going into detail as to the mechanism operating the various parts. The operator fills, with the articles to be wrapped, the magazine composed of the angular uprights 2, places in position a roller of waxed tissue paper 12, passes the end thereof through the slot in the guard 10 at the point 13, and draws the same downward until it engages the roller 14. He also fills the magazine 68 with a quantity of labels and places on top thereof a suitable weight so that they may have sufficient tension against the feeding rollers 70 and 71. A suitable belt being provided to drive the machine, its clutch is thrown into engagement and the machine started. The articles drop into each of the successive pockets of the wheel 4 and are carried around therewith, and the waxed paper as it passes around on the circumference of the wheel 4, is cut into suitable lengths by the cutters 17. Each successive article, together with a wrapper of waxed paper, is then transferred from the wheel 4 to the wheel 43. As the articles and wrappers thus held in the wheel 43 are carried along, the wrapper is folded and assumes the appearance shown in Fig. 26. The bands are fed in succession from the magazine 68 onto the surface of the wheel 88, and downward to a position where the periphery of the wheel 88 becomes adjacent to the wheel 43. At this position the previously wrapped articles are successively transferred from the wheel 43 to the wheel 88 and into engagement with each successive band being carried on the wheel 88. The wrapped articles are brought into contact with the bands in the relative position shown in Fig. 27 and when secured in the wheel 88 assumes the appearance shown in Fig. 28. Each successive article and band are now carried forward by the wheel 88 and the rear end of the band is folded down and the adhesive material applied thereto as shown in Fig. 29. The front end of the band is folded down on to the rear end and against the adhesive as shown in Fig. 30 and the articles are in succession ejected from the wheel 88 into the magazine 147, thus completing the operation, and the articles are then ready to be removed from the machine by the operator.

What I claim as new is:—

1. In a wrapping machine, the combination with a continuously rotating wheel provided with means for holding an article and its wrapper, of means for folding the wrapper about the article while carried by said wheel, a second continuously rotating wheel, means for transferring the article and wrapper from said first wheel to said second wheel and to a predetermined position upon a band, means for feeding said bands to the required position to receive the wrapped article, means for completing the folding of the band about the article, and means for applying adhesive to the band for securing the ends thereof later, said means being adapted to operate while the wrapped article and band are being carried by the second continuously rotating wheel.

2. In a wrapping machine, the combination with a continuously rotating wheel adapted to receive an article and band therefor of means for folding the rear end of the band over and upon the article, of means for applying an adhesive material to the outer face of the end of the band thus folded down, and means for folding the front end of the band over and upon the previously folded rear end of the band, whereby the two ends of the band will be secured together by the adhesive material, all of said means being adapted to operate while the article and band therefor are carried by, and during the continuous rotation of, said wheel.

3. In a wrapping machine, the combination with a continuously rotating wheel, adapted to receive an article, and a wrapper, of means for folding the wrapper outward about the article while both are carried by said wheel, a second continuously rotating wheel adapted to receive the wrapped article and a band therefor, means for transferring the wrapped article from the first wheel to the second wheel and to a predetermined position upon the band, which band is arranged at an angle to the first wrapper, and means for feeding the band to such an angular position to receive the wrapped article.

4. In a wrapping machine, a paper roll holder, a continuously rotating feed wheel provided with pockets, an article magazine, means for feeding the paper to the wheel, automatically placing the articles successively thereon, and automatically severing the paper into strips, means for automatically transferring the article and its paper strip to a second continuously rotating wheel provided with pockets, means for automatically folding the strip around the article while on the wheel to constitute a wrapper therefor, a label or band magazine, a third continuously rotating wheel provided with pockets, means for automatically feeding the labels to the wheel over the pockets, automatic means for transferring the wrapped article from the second wheel to the third wheel so that the wrapper on the article will be at an angle to the band on the third wheel, and means for automatically gumming said band and folding it around the article and its wrapper.

5. In a wrapping machine, a paper roll holder, a continuously rotating feed wheel provided with pockets, an article magazine, means for feeding the paper to the wheel, automatically placing the articles successively thereon and automatically severing the paper into strips, means for automatically transferring the article and its paper strip to a second continuously rotating wheel provided with pockets, means for automatically folding the strip around the article while on the wheel to constitute a wrapper therefor, a label or band magazine, a third continuously rotating wheel provided with pockets, means for automatically holding the labels to the wheel over the pockets, automatic means for transferring the wrapped article from the second wheel to the third wheel so that the wrapper on the article will be at an angle to the band on the third wheel, and means for automatically gumming said band, folding it around its wrapper while on the third wheel and discharging the wrapped article therefrom.

6. In a wrapping machine, the combination with a continuously revolving wheel having pockets adapted to receive an article to be wrapped and a wrapper, of a pivoted wrapping member adapted to contact with the wrapper to fold one end of it over the article, provided with an aperture whereby the folded end of the wrapper may be supplied with adhesive material without removing the wrapping member from the wheel, means for supplying such material through the aperture, comprising a swinging pasting roll and means whereby it may be intermittently swung between the aperture and a source of adhesive material, and means for folding the opposite end of the wrapper down on the adhesive material.

7. In a wrapping machine, the combination with a continuously revolving wheel having pockets adapted to receive an article to be wrapped and a wrapper, of a pivoted wrapping member adapted to contact with the wrapper to fold one end of it over the article, provided with an aperture whereby the folded end of the wrapper may be supplied with adhesive material without removing the wrapping member from the wheel, and means for supplying such material through the aperture, comprising a swinging pasting roll, and means whereby it may be intermittently swung between the aperture and a source of adhesive material, comprising a connecting rod, a cam, and a shaft rotating in unison with the continuously rotating wheel.

Witness my hand this 27th day of May, 1908, at the city of Elgin, in the county of Kane, and State of Illinois.

ALBERT M. PRICE.

Witnesses:
T. S. HUNTLEY,
M. A. SHULTZ.